United States Patent [19]  
Viscardi

[11] 4,096,930  
[45] Jun. 27, 1978

[54] GEAR SHIFT SELECTOR BRAKE INTERLOCK

[76] Inventor: Frank Viscardi, 16 Benson Rd., Glen Rock, N.J. 07452

[21] Appl. No.: 822,294

[22] Filed: Aug. 5, 1977

[51] Int. Cl.² .................. B60K 29/02; G05G 5/10
[52] U.S. Cl. ............................ 192/4 A; 74/483 K; 180/82 A
[58] Field of Search ............. 192/4 A; 74/483 K; 180/82 A, 82 B; 192/4 C

[56] References Cited
U.S. PATENT DOCUMENTS

| 2,426,365 | 8/1947 | Matlock | 192/4 C |
| 3,169,616 | 2/1965 | Hunsaker et al. | 192/4 C |
| 3,942,614 | 3/1976 | Thompson | 192/4 A |
| 3,944,016 | 3/1976 | Yamamori | 180/82 A |

Primary Examiner—Benjamin W. Wyche  
Attorney, Agent, or Firm—James J. Cannon, Jr.; James J. Cannon

[57] ABSTRACT

An automobile transmission gear shift selector brake interlock mechanism, for selectively preventing inadvertent movement of a motor vehicle gear shift selector mechanism, between a non-drive 'park' or "neutral" position, and a "drive" position, including a hydraulically, or mechanically-actuated interlock pin mechanism that is movable between a position in the path of the gear shift selector mechanism, and a removed position out of the path of the gear shift selector mechanism, when a motor vehicle brake pedal is actuated.

4 Claims, 7 Drawing Figures

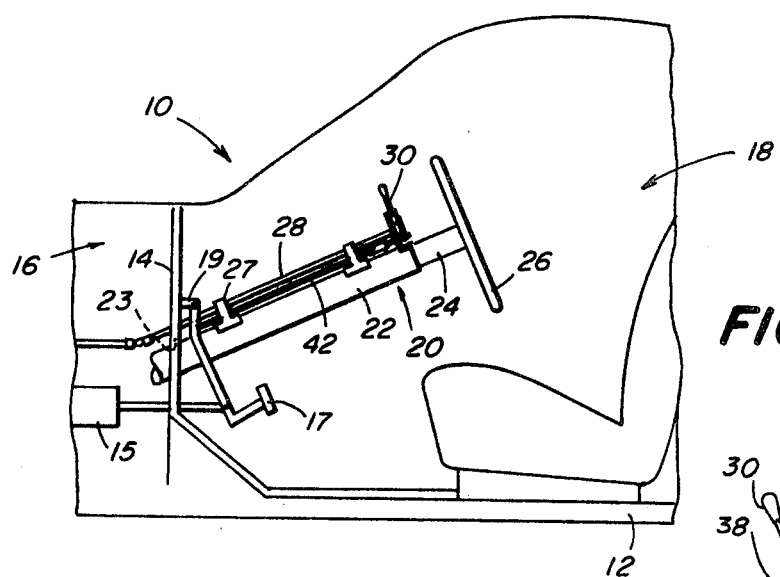
FIG. 1
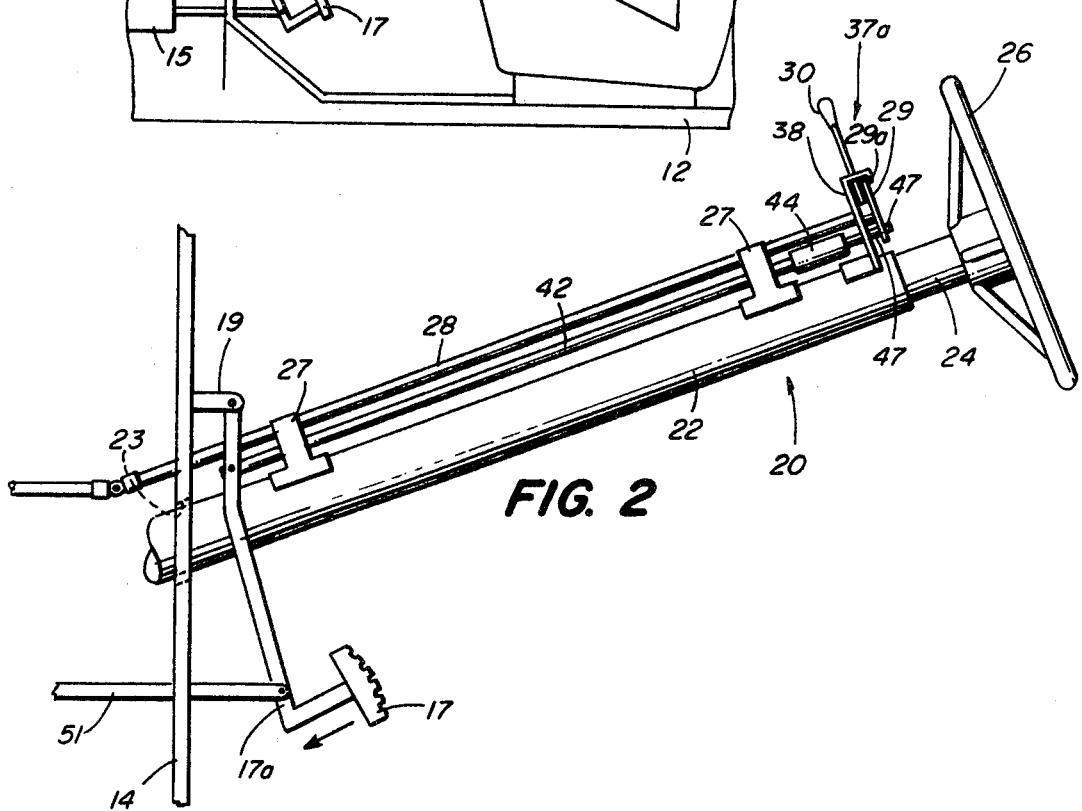
FIG. 2
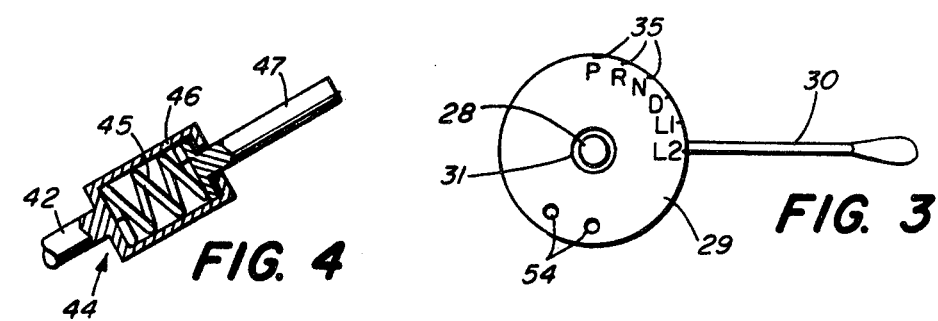
FIG. 4
FIG. 3

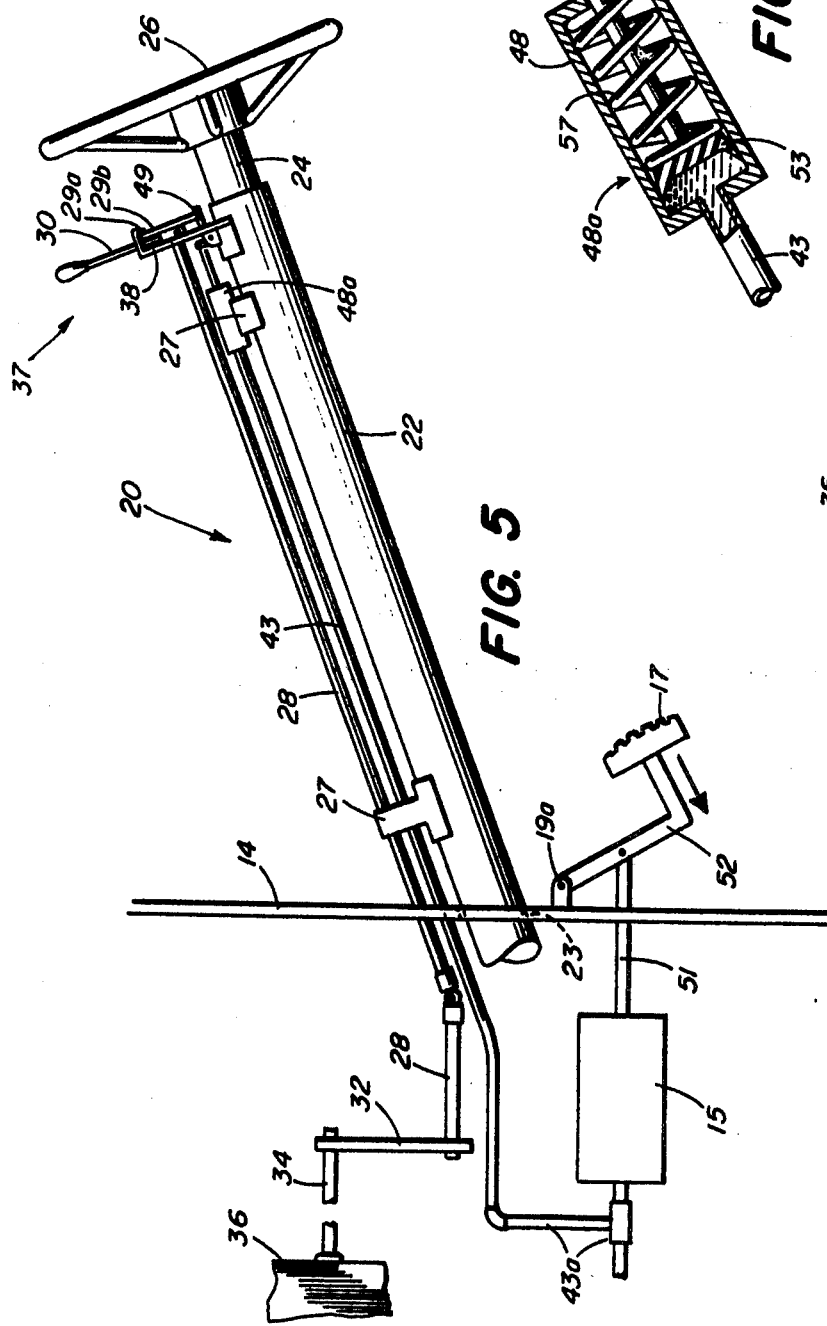
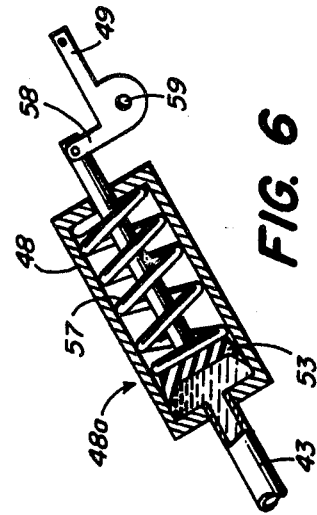
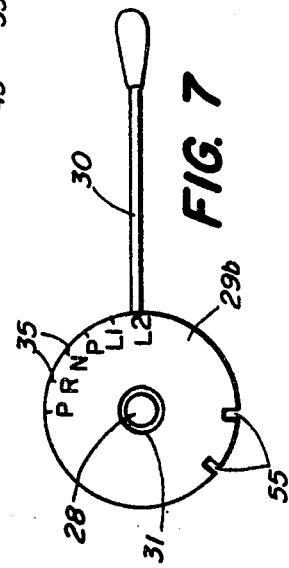
FIG. 5
FIG. 6
FIG. 7

GEAR SHIFT SELECTOR BRAKE INTERLOCK

BACKGROUND OF THE INVENTION

1. Field of the Invention

This invention relates to a safety interlock device for preventing the accidental movement of a motor vehicle gear shift selector lever to a 'drive' position, until a predetermined condition is satisfied, and more particularly to a gear shift lever lock mechanism which selectively inhibits movement of the gear shift selector lever to a drive position until an operator actuates the brake pedal.

2. Description of the Prior Art

It has long been recognized as a serious safety problem, that an automobile having an automatic transmission, may be inadvertently engaged to a drive position thereby resulting in a forward uncontrolled movement of the vehicle resulting in a serious personal and property damage. This can be particularly dangerous when the engine is freshly started and in a fast idle condition.

Each year, many accidents of this type occur when children who are left unattended in vehicles move the transmission gear shift selector lever to a "drive" or "reverse" position.

It is therefore, an object of the present invention to provide a transmission gear shift selector interlock mechanism which will prevent the accidental or inadvertent movement of an automobile gear shift selector lever to a "drive" or "reverse" position.

It is another object of the present invention to provide a gear shift selector interlock device of the type described, which cannot be moved from the lock position until the brake pedal has been actuated in a direction toward a braking position.

It is a further object of the present invention to provide a gear shift selector lever lock device which includes a control element located remotely from the lock device that must be actuated to operate the control element and permit the movement of the gear shift selector lever to a drive position.

It is yet another object of the present invention to provide a control system of the type described including a hydraulically, or mechanically energized spring, which moves a plunger between a position in the path of a gear shift selector lever, and a removed position out of the path, in response to actuation of a control element by the brake pedal.

It is another object of the present invention to provide apparatus which will enable a motor vehicle to be left safely unattended, even with a small child in the vehicle.

Other objects and advantages of the present invention will become apparent to those of ordinary skill in the art as the description there of proceeds.

SUMMARY OF THE INVENTION

Apparatus for selectively preventing and permitting movement of a motor vehicle transmission gear shift selector mechanism to a drive position including a mechanism movable between a position in the path of the gear shift selector plate mechanism and a removed position out of the path of the gear shift selector plate mechanism when the brake pedal means is depressed.

In the mechanical variation, upon driver actuation of the brake pedal means a linkage leading to a brake interlock lever results in the movement of an interlock pin means in the direction of the fire wall, thereby releasing a "captured" interlock pin resting within a gear shift plate mounted upon the steering column sleeve. The gear shift lever is now free to be moved to a "drive" position resulting in engagement of the vehicle transmission.

In the hydraulic variation, upon driver actuation the brake pedal means, a pedal linkage leads to an increase in pressure within the brake fluid reservoir. An interlock feed line from the brake line beyond the brake fluid reservoir, leads to a hydraulic brake interlock cable, which then leads to an hydraulically-actuated interlock pin means. This interlock pin means pressure increase causes a piston to depress a spring thereby resulting in movement to a linkage to an interlock pin. The interlock pin then moves away from its "captured" position on the periphery of the gear shift plate mounted upon the steering column sleeve. The gear shift lever is now free to be moved to a "drive" position, resulting in engagement of the vehicle transmission.

BRIEF DESCRIPTION OF THE DRAWINGS

FIG. 1, is a fragmentary sectional side view of a motor vehicle incorporating the apparatus constructed according to the present invention.

FIG. 2, is a side view of the mechanical embodiment of the mechanical variation apparatus of the present invention.

FIG. 3, is a front view of the gear shift plate of the embodiment of FIG. 2.

FIG. 4, is a cross-sectional view of the interlock pin mechanism of the embodiment of FIG. 2.

FIG. 5, is a side view of the hydraulic embodiment of the apparatus of the present invention.

FIG. 6, is a cross-sectional view of the interlock pin mechanism of the embodiment of FIG. 5.

FIG. 7, is a front view of the gear shift plate of the embodiment of FIG. 5.

DESCRIPTION OF THE PREFERRED EMBODIMENT

FIG. 1 is a fragmentary, schematic, sectional, side view of a motor vehicle, incorporating the apparatus constructed according to the present invention for use with a motor vehicle. The motor vehicle is generally designated 10, including a frame generally designated 12, having a fire wall 14, separating an engine compartment 16, from a passenger compartment 18. The motor vehicle 10 also includes a brake hydraulic cylinder 15, as usually controlled by foot-actuated brake pedal 17, swingable about a pivot 19 as usual. Motor vehicle 10 is equipped with an automatic transmission, not shown.

FIG. 2 is a side view of the apparatus of the mechanical embodiment constructed according to the present invention.

The motor vehicle 10 (FIG. 1) includes a steering column assembly generally designated 20, having a stationary tubular steering sleeve 22, journaling a steering post 24, which is rotatable in a to and fro path about its axis by a steering wheel 26, fixed to one end of the steering post 24. The opposite end of the steering post 24 is coupled to motor vehicle steering tie rods, not shown, which function to turn the vehicle wheels in the normal manner when the vehicle operator turns the steering wheel 26. The steering column assembly passes through a suitable opening 23 provided in the fire wall 14. Mounted on the steering sleeve 22, via brackets 27, is an elongated shift bar 28, which is rotated about its longitudinal axis via a manually graspable and adjustable gear shift lever 30, fixed to the upper end thereof. FIG. 5, shows the lower articulated end of the shift bar 28 mounted to a lever arm 32, which is connected to a linkage 34, that is coupled to the vehicle transmission, generally designated by 36. By rotating the shift bar 28 about its axis through the movement of the shift lever 30, the operator is able to select the transmission gear most suitable for proper performance of the vehicle.

Automatic transmissions generally are designed to allow the gear shift selector lever 30 to be manually movable between the "park", "neutral", "drive" and "reverse" positions. The gear shift selector lever 30 is relatively easily moved to any of its designated positions. If the parking brake is not pre-set, and the gear shift selector lever 30 is moved in to a 'drive' or 're-verse' position, the vehicle will move in a forward or reverse direction depending on the gear selected. This may inadvertently be done by an adult or child who cannot subsequently control the vehicle, with an unexpected accident then resulting.

The apparatus of the mechanical embodiment constructed according to the present invention generally is designated 37a, and includes a gear shift plate 29, coupled to the upper end of the steering sleeve 22, via mounting bracket 38.

FIG. 3, is a front view of the gear shift plate of the mechanical embodiment shown in FIG. 2.

The gear shift plate 29 is a circular plate structure, with a circular central opening 31, through which the gear shift bar 28 projects. The shift plate 29 is fixably mounted, coplanar to, and immediately behind the steering wheel 26, via said mounting bracket 38.

Engraved on the periphery of the front surface of the gear shift plate 29, are gear position markings 35, which indicate the gear shift selector lever 30 controlled alignment positions for "park", "reverse", "neutral" and "drive" positions. The gear shift selector lever 30 is an elongated, thin rod, which is situated immediately behind the said shift plate 29 and coupled to the shift plate 29 and longitudinal shift bar 28. Movement of the gear shift selector lever 30, through an arcuate path around the longitudinal axis of the shift bar 28, allows the gear shift selector lever 30 to align the said pre-set markings 35 on the gear shift plate 29, with the index 29a, thereby indicating the correct position for the desired setting of said shift lever 30 when changing transmission gear positions.

Also located along the peripheral border of the gear shift plate 29, and oppositely opposed to the said gear position markings 35 on its front surface, are interlock pin holes 54, which serve to seat an interlock pin 47, which will prevent movement of the gear shift selector lever 30, until the brake pedal 17 is depressed by the operator. The operator actuation of the brake pedal 17 from its normal rest position, to a braking position toward the fire wall 14, around pivot point 19, causes the elongated rod-like brake interlock lever 42, of the present invention, which is coupled to the brake pedal linkage 17a, to also move in the direction of the fire wall 14, resulting in a simultaneous movement in the direction of the fire wall 14, of the incorporated spring-loaded interlock pin mechanism 44, situated at the upper end of the brake interlock lever 42.

FIG. 4 is a cross-sectional view of the interlock pin mechanism of the mechanical embodiment shown in FIG. 2. The interlock pin mechanism 44 consists of a tube-like interlock spring housing chamber 46, attached at its lower base point to the brake interlock lever 42, and oriented along its longitudinal axis, and containing an interlock pin spring 45, which occupies most of the interlock spring housing central chamber 46, of the said interlock pin mechanism 44. The interlock pin 47 is situated movably in said interlock spring housing chamber 46 with the pin-like upper end projecting through the upper cover of the interlock spring housing chamber 46. The base of said interlock pin 47, being a circular disc with its lower surface resting in contact with said interlock pin spring 45, and its upper surface the attachment point for the said pin-like projection.

The above described sequence of events following brake pedal 17 actuation, results in the interlock pin 47 being retracted from its "captured" position within one of the two interlock holes 54 located on the face of the circular shift plate 29. The interlock holes 54 are aligned such that the interlock pin 47 is "captured" within one of the two interlock holes 54, on the shift plate 29, when the gear shift selector lever 30 has aligned the index 29a with the engraved gear position markings 35, of either the "park" or "neutral" positions.

FIG. 5, is a side view of the apparatus of the hydraulic embodiment constructed according to the present invention. In the hydraulic embodiment of the present invention, operator actuation of the brake pedal 17, from its rest position to a "braking position" in the direction toward the fire wall 14, around the pivot point 19a, results in the movement of a brake pedal linkage 52, in the direction of the fire wall 14, causing the hydraulic brake line activator 51, to increase the brake fluid pressure within the hydraulic brake system cylinder 15. This increase in brake fluid pressure results in a pressure increase within the hydraulic feed line 43a leading to the hydraulic brake interlock cable 43. This in turn results in a fluid pressure increase within the hydraulic-operated interlock pin mechanism 48a housing chamber 48.

FIG. 6, is a cross-sectional view of the interlock pin mechanism of the hydraulic embodiment of FIG. 5.

This pressure increase further causes interlock pin piston 53 to move in the direction of the shift plate 29, thereby compressing spring 57. The linkage 58, oriented coplanar to shift plate 29, and coupled to the outer projecting end of piston 53, moves through an arcuate path around pivot point 59, resulting in the interlock pin 49, which is oriented at right angles to linkage 58, to rotate downward. This movement downward of the interlock pin 49, away from the periphery of shift plate 29, results in a "release" of the interlock pin 49 from its "captured" position within one of the shift plate interlock notches 55. This now allows an unimpeded arcuate movement of the gear shift selector lever 30 to any desired drive position, resulting in an engagement of the vehicle transmission.

FIG. 7, is a front view of the gear shift plate of the hydraulic embodiment of FIG. 5. The gear shift plate 29b of the hydraulic embodiment, is identical in all respects with that of the gear shift plate 29 of the mechanical variation, except for the replacement of interlock notches 55, instead of the interlock holes 54 that are found in the mechanical embodiment.

As in the above-described mechanical embodiment, the shift plate interlock notches 55, are aligned such that the interlock pin 49 is "captured" within one of the two interlock notches 55, on the shift plate 29b, when the gear shift selector lever 30 aligns the index 29a with the engraved gear position markings 35, of either the "park" or "neutral" positions.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. A mechanically-actuated gear shift selector brake interlock mechanism, for motor vehicles having automatic transmissions comprising:
   a gear shift selector plate mounted rotatably at the upper end of a conventional steering column sleeve;
   said gear shift selector plate being circular and having gear position markings along the periphery of said selector plate;
   interlock pin holes situated on said gear shift selector plate;
   an interlock pin means consisting of a tubular elongated chamber containing an interlock pin spring and an interlock pin;
   said interlock pin holes on said gear shift selector plate serving to receive interlock pin of the interlock pin means;
   a brake interlock lever being an elongated rod-like structure extending from a linkage on the conventional brake pedal means to said interlock pin means;
   said interlock pin captured in said interlock pin hole on said gear shift plate when conventional gear shift selector lever is at park or neutral positions;
   said interlock pin being retracted from interlock pin hole located on said gear shift selector plate when brake pedal means has been actuated.

2. The apparatus of claim 1, wherein said interlock pin when in a captured position within said interlock pin hole, prevents further movement of a conventional gear shift selector lever, thereby preventing engagement of said automatic transmission.

3. A hydraulically actuated gear shift selector brake interlock mechanism for motor vehicles having automatic transmissions comprising:
   a gear shift selector plate rotatably mounted at the upper end of a conventional steering column sleeve;
   said gear shift selector plate being circular and having gear position markings along the periphery of said selector plate;
   interlock pin notches situated on periphery of said gear shift selector plate;
   an interlock pin mechanism consisting of a tubular elongated chamber containing an interlock pin piston, an interlock spring, and an interlock pin means including an interlock pin coupled to the said interlock pin piston;
   said interlock pin notches on said gear shift selector plate serving to receive said interlock pin of the said interlock pin means;
   a hydraulic brake feed line diverting brake fluid from a conventional brake system to a hydraulic brake interlock cable;
   said hydraulic brake interlock cable being an elongated tubular cable structure to lead brake fluid from said brake feed line to said hydraulically actuated interlock pin mechanism;
   said interlock pin captured in said interlock pin notch on said gear shift plate when said conventional gear shift lever is at park or neutral position;
   said interlock pin being retracted from said interlock pin notch located on said gear shift selector plate when said brake pedal means has been actuated.

4. The apparatus of claim 3, wherein said interlock pin when in a captured position within said interlock pin notch prevents further movement of a conventional gear shift selector lever, thereby preventing engagement of said automatic transmission.

* * * * *